(12) United States Patent
Holch

(10) Patent No.: US 6,309,436 B1
(45) Date of Patent: Oct. 30, 2001

(54) DEVICE FOR SEPARATING LIQUID PARTICLES FROM A GAS STREAM

(75) Inventor: Hans-Werner Holch, Heilbronn (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/341,582

(22) PCT Filed: Nov. 11, 1997

(86) PCT No.: PCT/EP97/06293

§ 371 Date: Sep. 10, 1999

§ 102(e) Date: Sep. 10, 1999

(87) PCT Pub. No.: WO98/31452

PCT Pub. Date: Jul. 23, 1998

(30) Foreign Application Priority Data

Jan. 15, 1997 (DE) .......................................... 297 00 579 U

(51) Int. Cl.[7] .................................................. B01D 50/00
(52) U.S. Cl. .............................. 55/337; 55/320; 55/417; 55/482; 123/198 E
(58) Field of Search .............................. 55/315, 318, 320, 55/337, 447, 417, 482; 95/286, 287, 271, 268; 123/198 E

(56) References Cited

U.S. PATENT DOCUMENTS

| | | | |
|---|---|---|---|
| 2,387,368 | * 10/1945 | Vokes | 55/482 |
| 3,320,727 | * 5/1967 | Farley et al. | 55/337 |
| 3,494,114 | * 2/1970 | Nelson et al. | 55/482 |
| 3,925,044 | * 12/1975 | Tu et al. | 55/337 |
| 4,087,263 | * 5/1978 | Schönmann, Jr. | 55/320 |
| 4,491,460 | * 1/1985 | Tokar | 55/337 |
| 4,516,994 | * 5/1985 | Kocher | 55/337 |
| 4,813,385 | * 3/1989 | Yamaguchi et al. | 55/320 |
| 4,946,483 | * 8/1990 | Coral | 55/337 |
| 4,947,806 | * 8/1990 | Speer et al. | 123/41.86 |
| 4,957,520 | * 9/1990 | Parmentier | 55/337 |
| 5,090,393 | * 2/1992 | Holch | 123/574 |
| 5,364,456 | * 11/1994 | Kahlbaugh et al. | 95/287 |
| 5,480,464 | * 1/1996 | DeVilliers et al. | 55/320 |
| 5,779,745 | * 7/1998 | Kilström | 55/337 |

FOREIGN PATENT DOCUMENTS

| | | |
|---|---|---|
| 37 35 913 | 11/1988 | (DE) . |
| 730 086 | 9/1996 | (EP) . |
| 2 572 305 | 5/1986 | (FR) . |

* cited by examiner

Primary Examiner—Duane Smith
Assistant Examiner—Jason M. Greene
(74) Attorney, Agent, or Firm—Crowell & Moring LLP

(57) ABSTRACT

A device for separating liquid particles from a gas stream including a filter insert (8, 9, 11) placed in a gas stream (3) generated by an external pressure difference. Liquid particles remain on the outer surface of the filter insert (8, 9, 11) on the raw gas side and form droplets which can flow down into a collecting chamber (6). The device is a compact separating module (1) with several stages, a cyclone (5), a filter insert (8, 9, 11) and a pressure regulating valve (12).

4 Claims, 1 Drawing Sheet

DEVICE FOR SEPARATING LIQUID PARTICLES FROM A GAS STREAM

BACKGROUND OF THE INVENTION

The invention relates to a device for separating liquid particles from a gas stream, in particular an oil vapor separator in accordance with the preamble to the main claim.

The fact that such filter inserts are directed into the flow path of a gas stream and get caught on the stationary structures of the filter inserts in the process, for example on the filaments of a non-woven fabric and liquid droplets which trickle into a collection chamber and then can be removed from there or can be redirected into a liquid circulation system is known from GB 988 692, for example. It is important for many types of applications, such as for a device in the suctioning tract of an internal combustion engine for a motor vehicle, that a higher degree of separation be attained at a lower loss of pressure in the flow path, without the need for combining a large number of additional aggregates in a manner that demands a great deal of space.

For example, that a pressure control valve is connected into a suctioning path is a known fact from DE-40 22 129 C2 (corresponding to U.S. Pat. No. 5,090,393). This pressure control valve is built into an air exhaust pipe between the engine crankcase and the suctioning pipe or the air filter in a motor vehicle by means of two flanges, for example.

SUMMARY OF THE INVENTION

The basis of the task of the invention is to develop a device for separating liquid particles from a gas stream in accordance with the preamble to the main claim in a simple manner, such that a compact module can be constructed in which a high level of separation is reliably ensured under ideal pressure conditions. The inventive device for separating liquid particles from a gas steam, in particular as an oil vapor separator, solves the task assigned with the characteristics indicated in the distinguishing features of the main claim.

The inventive device is particularly advantageous because a compact arrangement as well as a cyclone for the first crude separation of liquid particles and a subsequent filter insert for other, finer levels of separation in connection with a pressure control valve, which is located directly on the filter insert in a universal housing and which ensures an ideal rate of flow of the gas stream in a structurally simple manner.

In order to separate the liquid particles as completely as possible, it is important that the rate of flow of the gas particularly correspond with the permeability conditions of the filter inserts so that the liquid condensation form are not entrained once again via an overly-high rate of streaming gas. The size of the droplets forming also plays a role in relation with the fiber structure of the filter insert in this connection.

The inventive device is particularly advantageous in accordance with an embodiment of a sub-claim with a multi-layered filter insert. A crude separation and a fine separation can be undertaken in this connection with different layers of the filter insert, for example with a relatively narrow fiber structure and a relatively coarse fiber structure. The fine-tuning of the rate of flow necessary for this is feasible in a simple manner by means of the pressure control valve which is located immediately thereafter in the direction of flow. The rate of flow is accordingly optimized such that droplets of a certain size, determined by the fiber structure, are no longer entrained into the gas stream, as a result of which the separation effect would be diminished.

Other advantageous embodiments are stated in the other sub-claims.

BRIEF DESCRIPTION OF THE DRAWING

An embodiment of the inventive device for separating liquid particles from a gas stream is explained using the illustration. The FIGURE in the illustration shows a cross-section through a module wit h a multi-stage separation of the liquid particles.

DETAILED DESCRIPTION OF A PREFERRED EMBODIMENT

Figure 1:
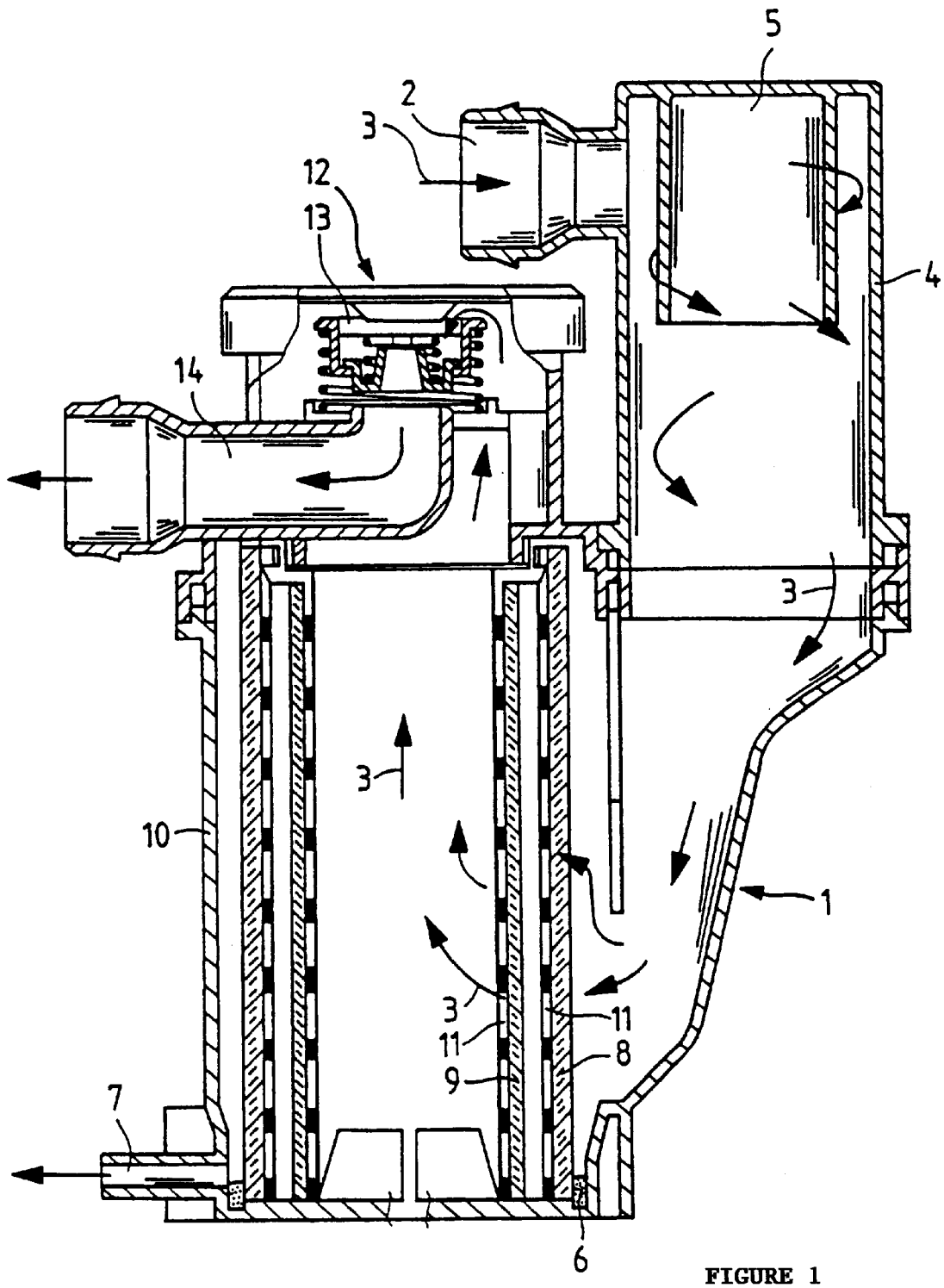

A separating module 1 is shown in the FIGURE in which the gas, which is indicated by arrows 3, enters the separating module through a raw gas inlet 2. A first cyclone, which is formed by a cylinder 5 located in the interior and which sets the incoming gas in rotation via a guide device or the like, is located in a first cylinder 4. The liquid particles are accelerated radially via the rotation and then flow away from the side walls of the cylinder 4 into a collection chamber 6.

The collection chamber 6, depicted here schematically, is connected to a liquid outlet 7 in the lower area of the module 1. The liquid outlet 7 is embodied as a siphon-like drain, not shown in more detail here, so that interfering gas suctioning does not ensue in the separation module 1.

The gas purified in the first stage described above enters a second cylinder 10 onto layers 8 and 9 of the filter insert, each of which are held on a gas-permeable support body 11. Liquid droplets, which are separated from the gas stream (arrow 3) and which also are deposited in the collection chamber 6, likewise form in these separating layers, which are made of varying fibrous structures.

The pure gas, which has now been essentially liberated of liquid particles, is guided in cylinder 10 into the pressure control valve 12 located above. The pressure control valve 12, not explained in more detail here, is specified in the prior art mentioned above in U.S. Pat. No. 5,090,393, which is expressly incorporated by reference herein, and has the task of ensuring a relatively constant pressure and, accordingly, a constant rate of flow in the interior of the separating module 1, even in the event of large vacillations of the pressure exerted from the exterior. The pure gas (arrow 3) hereby enters the upper area 13 of the pressure control valve 12 and leaves the separating module 1 via the pure gas outlet 14.

What is claimed is:

1. A compact apparatus for separating liquid particles from a gas stream produced by an external pressure difference, said apparatus comprising a multi-stage separating module comprising a raw gas inlet, first and second separating stages, a collecting chamber for collecting liquid separated from the gas stream by said first and second separating stages, and a clean gas outlet;

said first separating stage being arranged under said raw gas inlet and comprising a cyclone disposed in the gas stream for separating liquid particles by rotational acceleration;

said second separating stage being disposed laterally adjacent said first separating stage and comprising a cylindrical filter insert disposed in a cylindrical housing such that substantially its entire radially outer surface can be contacted by the gas stream, said filter insert comprising concentric first and second annular separating layers each being supported on a respective annularly internal gas permeable support body; and said apparatus further comprising a pressure responsive gas flow regulating valve disposed directly above the filter insert between the filter insert and the clean gas outlet of the separating module, said pressure responsive gas flow regulating valve ensuring a substantially constant pressure in the separation module and a substantially constant rate of gas flow through the separation module despite variations in the external pressure difference.

2. An apparatus according to claim 1, wherein said first and second separating stages comprise first and second hollow cylinders connected to each other at the bottom, wherein the cyclone of said first separating stage is arranged in the first hollow cylinder such that liquid particles separated from the gas stream by rotational acceleration impinge upon an internal wall of the first cylinder and run down said first wall to the collecting chamber; and wherein the second hollow cylinder forms the cylindrical housing of the second separating stage, and the filter insert of said second separating stage is arranged in the second cylinder such that liquid particles remaining in the gas stream after the first separation stage impinge upon the separating layers of the filter insert and run down the separating layers to the collecting chamber.

3. An apparatus according to claim 1, wherein the first and second separating layers of said filter insert comprise fibrous textile layers, and the gas permeable support bodies are hollow cylindrical bodies.

4. In an internal combustion engine having an air intake tract, the improvement comprising an apparatus according to claim 1, arranged in the air intake tract to separate oil particles from air sucked in through the air intake tract.

* * * * *